(12) United States Patent
Tamai et al.

(10) Patent No.: US 6,238,014 B1
(45) Date of Patent: May 29, 2001

(54) ELECTROMAGNETIC VALVE (75) Inventors: Naotoshi Tamai; Takaomi Sirase; Naoki Masuda; Makoto Kikuchi, all of Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 09/294,309

(22) Filed: Apr. 20, 1999

(30) Foreign Application Priority Data

Jun. 30, 1998 (JP) .................................................. 10-184008

(51) Int. Cl.[7] ....................................................... B60T 8/36
(52) U.S. Cl. ........................................................ 303/119.2
(58) Field of Search ............................. 303/119.2, 113.2, 303/116.1, 900; 251/129.02; 137/901; 188/181 R (56) References Cited

U.S. PATENT DOCUMENTS

| 3,818,927 | 6/1974 | Zeuner . |
| 5,167,442 | 12/1992 | Alaza et al. . |
| 5,318,066 | 6/1994 | Burgdorf et al. . |
| 5,476,313 | 12/1995 | Lauer . |
| 5,496,100 | 3/1996 | Schmid . |
| 6,092,781 | * 7/2000 | Hohl ................................ 251/129.02 |

FOREIGN PATENT DOCUMENTS

| 41 29 638 A1 | 3/1993 | (DE) . |
| 7-502473 | 3/1995 | (JP) . |

* cited by examiner

Primary Examiner—Christopher P. Schwartz
Assistant Examiner—C. T. Bartz
(74) Attorney, Agent, or Firm—McGuirewoods LLP (57) ABSTRACT An electromagnetic valve is fitted with relief means and is made to have a compact diameter without increasing its axial length is provided. The electromagnetic valve is provided with a push bar capable of pushing the valve body toward the valve seat and a relief spring for urging the push bar toward the valve body are contained in a guide hole formed in the central portion of the moving core, wherein a stopper is provided to the moving core, the stopper being used for holding the valve body open by defining a limit to which the push bar is moved forward with respect to the valve body when the moving core is moved backward and for allowing the valve body to be closed by the relief spring when the moving core is moved forward. Thus, the valve body and the push bar are axially arranged separately from each other.

20 Claims, 4 Drawing Sheets

ELECTROMAGNETIC VALVE

BACKGROUND OF THE INVENTION

1. Field of the Invention

The present invention generally relates to electromagnetic valves such as, for example, used in vehicle anti-lock braking systems and, more particularly, to improved electromagnetic valves having a relief for relieving an excessive hydraulic pressure when the hydraulic pressure received by a valve body exceeds a predetermined value when the valve body is closed by excitation of a coil.

2. Background Description

A known electromagnetic valve fitted with a relief means has been disclosed in, for example, Japanese Patent Publication No. 502473/1995. There, a series of guide holes is formed in a valve housing and the central portion of a fixed core. Hollow push bars, which are pushed forward when the coil is excited, are fitted in the respective guide holes. A valve body is slidably fitted in the hollow push bar and contains a relief spring for urging the valve body in the direction of the closing the valve. Furthermore, a valve spring for urging the push bar in the direction of opening the valve body is provided in the valve housing, whereas the push bar is fitted with a stopper for defining a limit to which the valve body is moved forward by the relief spring in the direction of closing the valve body. While the valve body is kept open by defining the limit to which the push bar is moved forward toward the valve body when the moving core is moved back, the valve body is allowed to be opened by a relief valve as the moving core moves forward. This electromagnetic valve demonstrates the relief function in that while the valve body is made to perform the normal opening-closing operation as the coil is excited or demagnetized in addition to the case where even in its closed state, the function of relieving the excessive hydraulic pressure is ensured by allowing the valve body to be opened by the relief spring. Therefore, special relief valves are not needed to be connected to such electromagnetic valves in parallel, so that the hydraulic fluid circuit is simplified further.

However, a valve housing having a relatively large diameter has to be formed because the valve body and the push bar are doubly arranged on the inside and outside of the valve housing and contained therein in the prior art and this has made it difficult to reduce the diameter size of an electromagnetic valve.

SUMMARY OF THE INVENTION

It is therefore an object of the present invention to provide an electromagnetic valve which is fitted with relief means and can be made to have a compact diameter without increasing its axial length.

In order to accomplish the above object, an electromagnetic valve, according to the present invention, comprises a valve housing having a valve seat, a valve body which is contained in the valve housing such that the valve body is positioned opposite to the valve seat so that the valve body can be seated on the valve seat. A valve spring urges the valve body in the direction of separating the valve body from the valve seat. A fixed core is coupled to one end of the valve housing and a moving core which is longitudinally movable with respect to the fixed core is used for seating the valve body on the valve seat when moved forward. A coil moves the moving core forward when excited, and is characterized in that a push bar capable of pushing the valve body toward the valve seat and a relief spring for urging the push bar toward the valve body are contained in a guide hole formed in the central portion of the moving core. A stopper is provided to the moving core, the stopper being used for holding the valve body open by defining a limit to which the push bar is moved forward with respect to the valve body when the moving core is moved backward and for allowing the valve body to be closed by the relief spring when the moving core is moved forward.

In the present invention, unlike the prior art structure in which the valve body and the push bar are doubly arranged in the valve housing, the valve body and the push bar are axially arranged separately from each other, so that the valve housing has a more compact diameter. Moreover, an increase in the axial length of the electromagnetic valve can be held in check since the interior of the moving core is utilizable for arranging the push bar and the relief spring.

In addition, the present invention also features that a fitting hole for fitting a valve seat body having the valve seat and a valve opening for slidably fitting the valve body therein are coaxially formed in the valve housing.

According to the second feature of the present invention, the valve seat body and the valve body can readily be arranged coaxially with precision without increasing the production cost, whereby the valve body is restrained from being incompletely closed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
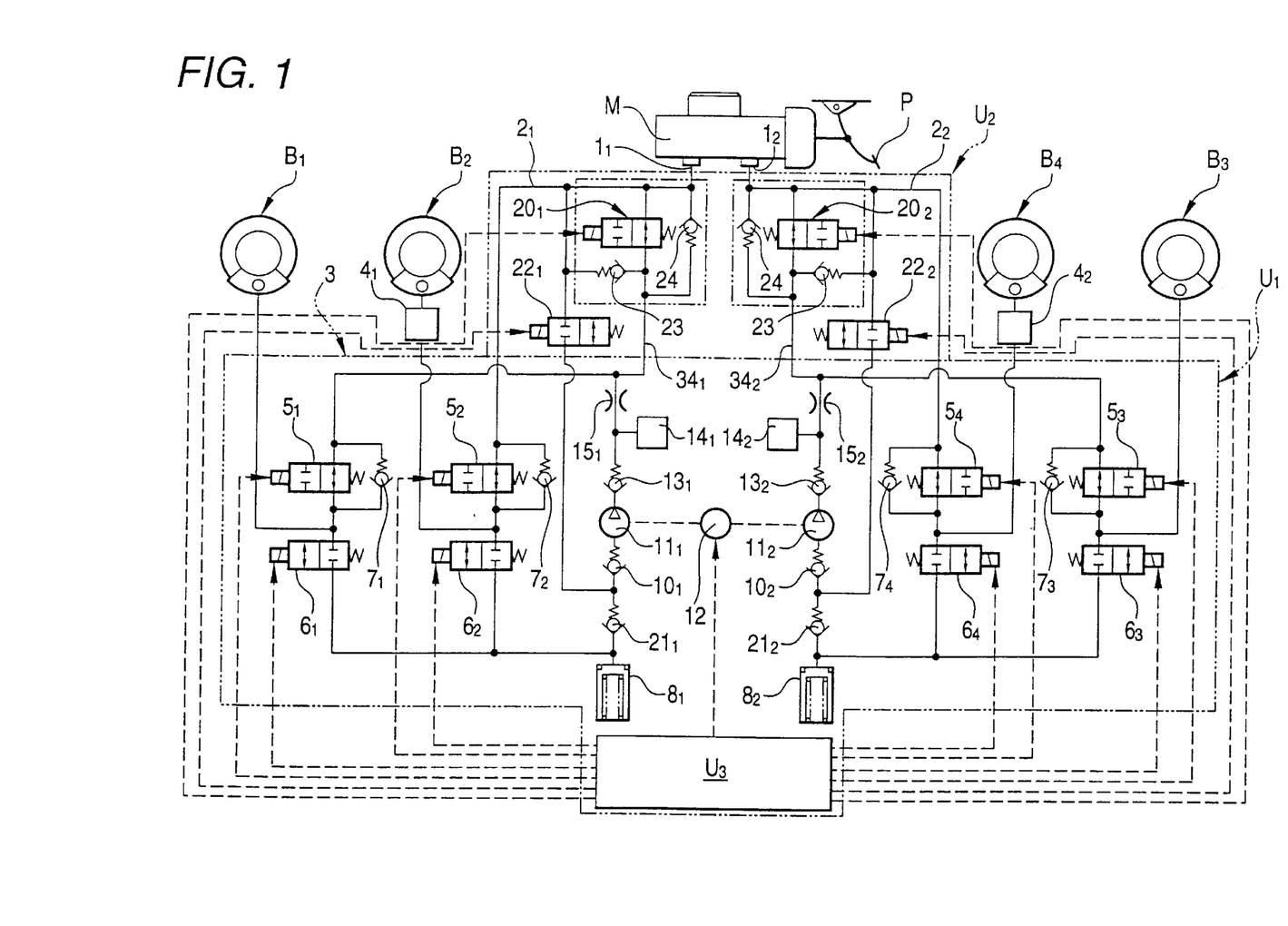
FIG. 1 is a diagram illustrating a hydraulic circuit of an antilock brake system using electromagnetic valves embodying the present invention in a front-wheel-drive motor vehicle.

Referring now to the drawings, and more particularly to FIG. 1, a description will be given of a hydraulic circuit in an antilock brake system using electromagnetic valves embodying the present invention in a front-wheel-drive motor vehicle. A tandem-type master cylinder M is fitted with a pair of first and second output ports $1_1$ and $1_2$ for generating braking hydraulic pressure corresponding to the stepping-on force applied to a brake pedal P. A modulator 3 is installed between a series of brakes including a left front wheel brake $B_1$, a right rear wheel brake $B_2$, a right front wheel brake $B_3$ and a left rear wheel brake $B_4$. First and a second output hydraulic passage $2_1$ and $2_2$ are individually connected to the respective first and second output ports $1_1$ and $1_2$. Furthermore, a first and a second proportional pressure reducing valves $4_1$ and $4_2$ are installed between the modulator 3 and the right and left rear wheel brakes $B_2$ and $B_4$, respectively.

The modulator 3 comprises an antilock control unit U1, a traction control unit $U_2$ and an electronic control unit $U_3$ for controlling both the control units $U_1$ and $U_2$. The antilock control unit $U_1$ comprises a first, a second, a third and a fourth normally open electromagnetic valve $5_1$–$5_4$, respectively, corresponding to the left front wheel brake $B_1$, the right rear wheel brake $B_2$, the right front wheel brake $B_3$ and the left rear wheel brake $B_4$. A first, a second, a third and a fourth check valve $7_1$–$7_4$, respectively, are connected in parallel to the respective normally open electromagnetic valves $5_1$–$5_4$. A first, a second, a third and a fourth normally closed electromagnetic valve $6_1$–$6_4$, respectively, individually correspond to the respective wheel brakes $B_1$–$B_4$. A first and a second reservoir $8_1$ and $8_2$ correspond to the respective first and second hydraulic passages $2_1$ and $2_2$. A first and a second plunger type hydraulic pump $11_1$ and $11_2$ are connected via suction valves $10_1$ and $10_2$, respectively, to the respective first and second reservoirs $8_1$ and $8_2$. An electric motor 12 is provided for common use in driving the hydraulic pumps $11_1$ and $11_2$. A first and a second damper $14_1$ and $14_2$ are respectively connected via discharge valves $13_1$ and $13_2$ to the respective first and second hydraulic pumps $11_1$ and $11_2$, and a first and a second orifice $15_1$ and $15_2$ are respectively installed between the first and second hydraulic pumps 21 and 22 and the first and second dampers $14_1$ and $14_2$.

The first normally open electromagnetic valve $5_1$ is installed between the first output hydraulic passage 21 and the left front wheel brake $B_1$. The second normally open electromagnetic valve $5_2$ is between the first output hydraulic passage 21 and the first proportional pressure reducing valve $4_1$. The third normally open electromagnetic valve $5_3$ is between the second output hydraulic passage 22 and the right front wheel brake $B_3$, and the fourth normally open electromagnetic valve $5_4$ is between the second output hydraulic passage 22 and the second proportional pressure reducing valve $4_2$.

The first through fourth check valves $7_1$–$7_4$ for allowing the brake fluid to flow from the corresponding wheel brakes $B_1$–$B_4$ to the master cylinder M are connected in parallel to the respective normally open electromagnetic valves $5_1$–$5_4$.

The first normally closed electromagnetic valve $6_1$ is installed between the left front wheel brake $B_1$ and the first reservoir $8_1$. The second normally closed electromagnetic valve $6_2$ is between the first proportional pressure reducing valve $4_1$ and the first reservoir $8_1$. The third normally closed electromagnetic valve $6_3$ is between the right front wheel brake $B_3$ and the second reservoir $8_2$, and the fourth normally closed electromagnetic valve $6_4$ is between the second proportional pressure reducing valve $4_2$ and the second reservoir $8_2$.

Feeding current to the first through fourth normally open electromagnetic valves $5_1$–$5_4$, the first through fourth normally closed electromagnetic valves $6_1$–$6_4$ and the electric motor 12 is controlled by the electronic control unit $U_3$.

Thus, the normally open electromagnetic valves $5_1$–$5_4$ remain demagnetized and are kept open and the normally closed electromagnetic valves also remain demagnetized and are kept closed during the normal braking operation when each of the wheels is unlikely to lock. Consequently, the pressure of the brake fluid outputted from the first output port $1_1$ of the master cylinder M is applied to the left front wheel brake $B_1$ via the first normally open electromagnetic valve $5_1$ and also to the right rear wheel brake $B_2$ via the second normally open electromagnetic valve $5_2$ and the first proportional pressure reducing valve $4_1$. Moreover, the pressure of the brake fluid output from the second output port $1_2$ of the master cylinder M is applied to the right front wheel brake $B_3$ via the third normally open electromagnetic valve $5_3$ and also to the left rear wheel brake $B_4$ via the fourth normally open electromagnetic valve $5_4$ and the second proportional pressure reducing valve $4_2$.

When any one of the wheels becomes likely to lock during the aforementioned braking operation, the electronic control unit $U_3$ operates to excite and close the normally open electromagnetic valve corresponding to the wheel which tends to become locked out of the first through fourth normally open electromagnetic valves $5_1$–$5_4$ and simultaneously excite and open the normally closed electromagnetic valve corresponding to that wheel out of the first through fourth normally closed electromagnetic valves $6_1$–$6_4$. Then, part of the braking hydraulic pressure is absorbed by the first reservoir $8_1$ or the second reservoir $8_2$, which results in reducing the braking hydraulic pressure. When the braking hydraulic pressure is kept constant, it is only needed to excite and close the normally open electromagnetic valves $5_1$–$5_4$ and also excite and close the normally closed electromagnetic valves $6_1$–$6_4$. When the braking hydraulic pressure is raised, it is only needed to demagnetize and open the normally open electromagnetic valves $5_1$–$5_4$ and also demagnetize and close the normally closed electromagnetic valves $6_1$–$6_4$. Thus, the wheels can efficiently be braked through the above control method without causing the wheels to be locked.

While the antilock control is performed like that, the electronic control unit $U_3$ also feeds current to electric motor 12 and makes it operate. As the first and second hydraulic pumps $11_1$ and $11_2$ are driven by the electric motor 12 thus started, the brake fluid absorbed into the first and second reservoirs $8_1$ and $8_2$ is sucked by the first and second hydraulic pumps $11_1$ and $11_2$. Subsequently, the brake fluid is discharged into the first and second dampers $14_1$ and $14_2$ before being made to flow back to the first and second output hydraulic passages $2_1$ and $2_2$ via the first and second orifices $15_1$ and $15_2$. The stepping-on quantity of the brake pedal P is prevented from increasing by causing the brake fluid to be absorbed into the reservoirs $8_1$ and $8_2$ due to the back flow of the brake fluid. In addition, a brake-pedal P operating feeling is never impeded despite the aforementioned back flow of the brake fluid because the pulsation of the discharge pressure of the hydraulic pumps $11_1$ and $11_2$ is attenuated through the cooperation of the dampers $14_1$ and $14_2$ and the orifices $15_1$ and $15_2$.

The traction control unit $U_2$ comprises a first and a second normally open traction-controlling electromagnetic valve $20_1$ and $20_2$ respectively installed between the first and second output hydraulic passages $2_1$ and $2_2$ and the first and third normally open electromagnetic valves $20_1$ and $20_2$; a first and a second traction-controlling check valve $21_1$ and $21_2$ respectively installed between the first and second reservoirs $8_1$ and $8_2$ and the first and second suction valves $10_1$ and $10_2$; and a first and a second normally closed traction-controlling electromagnetic valve $22_1$ and $22_2$ respectively installed between the outlets of the first and second traction-controlling check valves $21_1$ and $21_2$ and the first and second normally closed traction-controlling electromagnetic valves $22_1$ and $22_2$.

This invention is applied to the first and second normally open traction-controlling electromagnetic valves $20_1$ and $20_2$, each of which is provided with a relief means 23 and a check valve 24.

Feeding current to the first and second traction-controlling normally open electromagnetic valves $20_1$ and $20_2$, and the first and second normally closed traction-controlling electromagnetic valves $22_1$ and $22_2$ is controlled by the electronic control unit $U_3$.

Ordinarily, the first and second normally open traction-controlling electromagnetic valves $20_1$ and $20_2$ remain demagnetized and are kept open and the first and second normally closed traction-controlling electromagnetic valves $22_1$ and $22_2$ remain demagnetized and are kept closed. Consequently, the braking can be activated without any impediment because the output hydraulic pressure of the first and second output ports $1_1$ and $1_2$ of the master cylinder M is applied to the first to fourth normally open electromagnetic valves $5_1$–$5_4$ of the antilock control unit $U_1$ via the first and second normally open traction-controlling electromagnetic valves $20_1$ and $20_2$ during the normal braking operation.

When the front wheels as driving wheels tend to spin at the time of starting a motor vehicle, for example, the first and second normally open traction-controlling electromagnetic valves $20_1$ and $20_2$ are excited and closed, whereas the first and second normally closed traction-controlling electromagnetic valves $22_1$ and $22_2$ are excited and opened. Simultaneously, the electric motor 12 is actuated so as to drive the first and second hydraulic pumps $11_1$ and $11_2$. The first and second hydraulic pumps $11_1$ and $11_2$ suck hydraulic fluid in the master cylinder M from the first and second output ports 11 and 12 via the first and second normally closed traction-controlling electromagnetic valves $22_1$ and $22_2$ and supply the hydraulic fluid to the left and right front wheel brakes $B_1$ and $B_3$ via the first and third normally open electromagnetic valves $5_1$ and $5_3$ of the antilock control unit $U_1$. Since the flow of the hydraulic fluid toward the master cylinder M is blocked by the first and second normally open traction-controlling electromagnetic valves $20_1$ and $20_2$, any one of the corresponding front wheels is automatically prevented from spinning by activating the left and right front wheel brakes $B_1$ and $B_3$.

When the discharge pressure of the hydraulic pumps $11_1$ and $11_2$ exceeds a predetermined value (e.g., 70 kg/cm$^2$), excessive hydraulic pressure flows back toward the master cylinder M due to the relief function of the relief means 23 of the respective first and second normally open traction-controlling electromagnetic valves $20_1$ and $20_2$. Consequently, the excessive hydraulic pressure is prevented from acting on the left and right front wheel brakes $B_1$ and $B_3$.

The check valves 24 of the respective first and second normally open traction-controlling electromagnetic valves $20_1$ and $20_2$ allow the hydraulic fluid to flow from the master cylinder M toward the antilock control unit $U_1$. During the traction-controlling operation, that is, even when the first and normally open electromagnetic valves $20_1$ and $20_2$ are closed, the operation of stepping on the brake pedal P causes the output hydraulic pressure from the first and second output ports $1_1$ and $1_2$ of the master cylinder M to be applied to the corresponding wheel brakes $B_1$–$B_4$ via the first through fourth normally open electromagnetic valves $5_1$–$5_4$ of the antilock control unit $U_1$ in the open state, whereby the brakes can be actuated without any impediment. Although the output hydraulic pressure from the first and second output ports $1_1$ and $1_2$ of the master cylinder is passable through the first and second normally closed traction-controlling electromagnetic valves $22_1$ and $22_2$ in the open state then, the reservoirs $8_1$ and $8_2$ are prevented from unnecessarily absorbing the hydraulic pressure because the hydraulic pressure is blocked by the first and second traction-controlling check valves from being transmitted to the first and second reservoirs $8_1$ and $8_2$.

Figure 2:
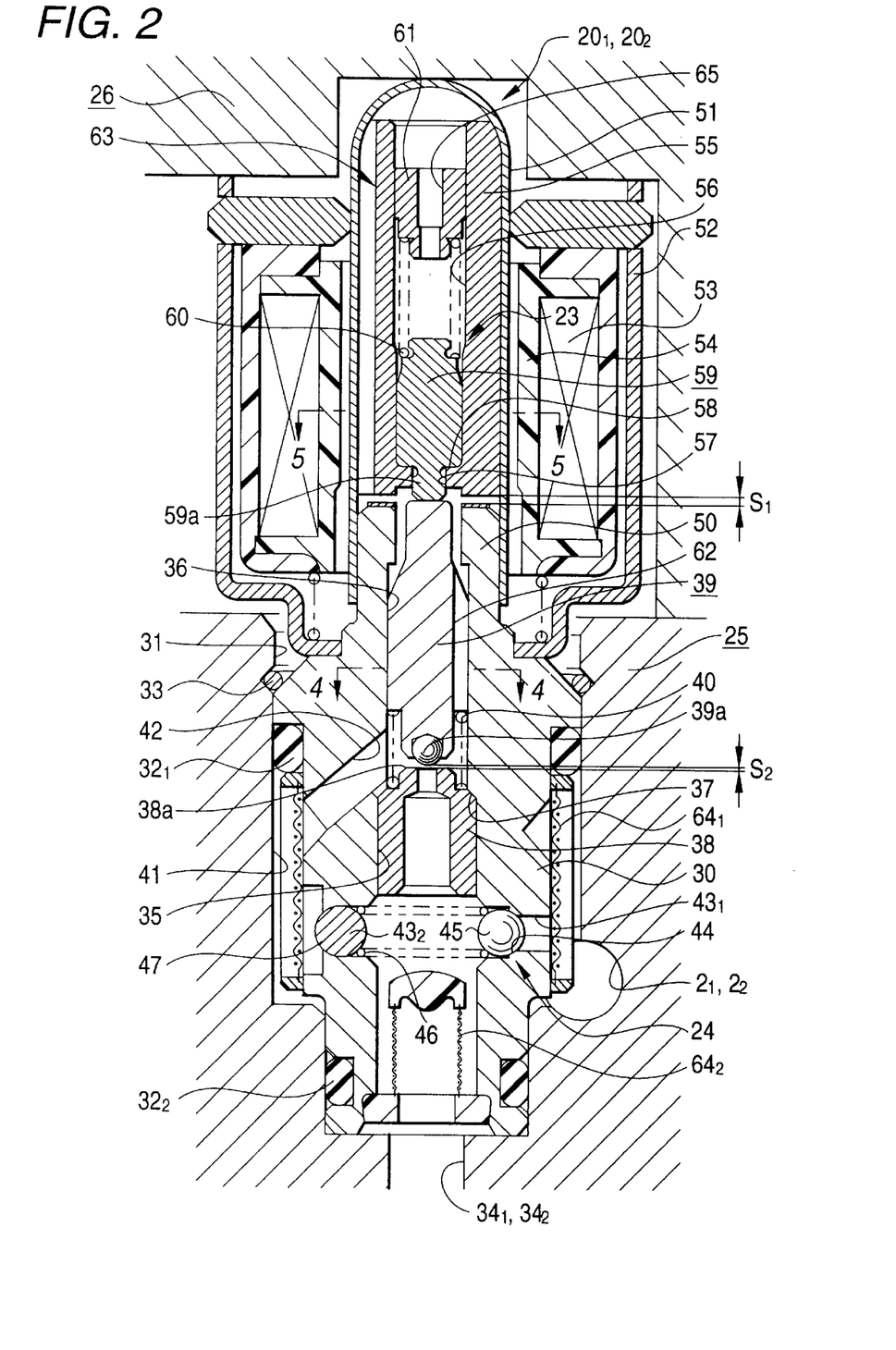
FIG. 2 is an enlarged vertical sectional view of the electromagnetic valve.
Figure 3:
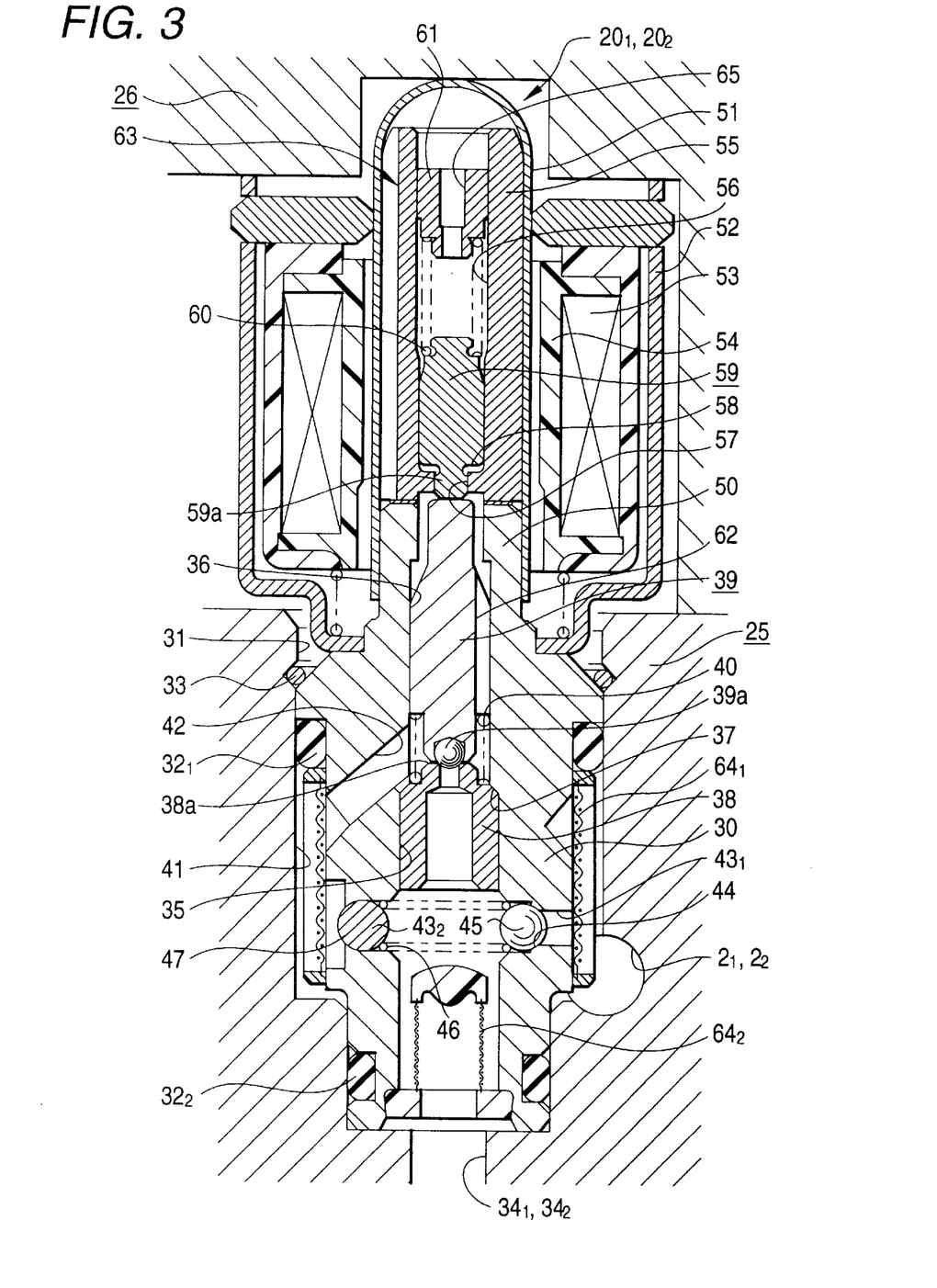
FIG. 3 is an enlarged vertical sectional view illustrating the function of the electromagnetic valve.

The first and second normally open electromagnetic valves $20_1$ and $20_2$ to which the invention has been applied in the traction control unit $U_2$ will now be described with reference to FIGS. 2 and 3. However, as the first and second normally open electromagnetic valves $20_1$ and $20_2$ are identical in structure with each other, only one normally open electromagnetic valve is shown in FIGS. 2 and 3.

The modulator 3 is fitted with a housing 25 of aluminum alloy, and a plastic casing 26 coupled to the top of the housing 25 with bolts (not shown), the first and second normally open traction-controlling electromagnetic valves $20_1$ and $20_2$ being fitted therebetween.

A valve housing 30 of each of the normally open electromagnetic valves $20_1$ and $20_2$ is fitted into the fitting hole 31 of the housing 25 via a pair of upper and lower sealing members $32_1$ and $32_2$ and secured to the housing 25 via a retaining ring 33. The first and second output hydraulic passages $2_1$ and $2_2$ are opened in the fitting hole 31 between both the sealing members $32_1$ and $32_2$. Hydraulic passages $34_1$ and $34_2$ extending toward the discharge sides of the first and second hydraulic pumps $11_1$ and $11_2$ (FIG. 1) are opened below the lower sealing member $32_2$.

The valve housing 30 is provided with a large-diameter fitting hole 35 communicating with the hydraulic passages $34_1$ and $34_2$ (FIG. 1) opening in the lower edge face of the valve housing 30, and a small-diameter valve opening 36 which opens in the upper edge face thereof with an annular stepped portion 37 held therebetween, the fitting hole 35 and the valve opening 36 being coaxial and communicative with each other. A valve seat body 38 having a valve seat 38a on its upper edge face is press-fitted into the fitting hole 35 so that the valve seat 38a is brought into contact with the annular stepped portion 37. Furthermore, a valve body 39 having a spherical valve portion 39a at its lower end is slidably fitted in the valve opening 36, the spherical valve portion 39a being situated opposite to the valve seat 38a. A valve spring 40 for urging the valve body 39 in the direction of detaching the valve body 39 from the valve seat 38a, that is, in the direction of opening the valve, is also contained in the valve opening 36.

A partitioned annular fluid chamber 41 surrounding the valve housing 30 with both the sealing members $32_1$ and $32_2$ is formed in the fitting hole 31. The annular fluid chamber 41 communicates with not only the first and second output hydraulic passages $2_1$ and $2_2$ but also the valve opening between the valve seat 38a and the valve portion 39a via the slanting fluid hole 42 of the valve housing 30.

A first and a second lateral holes $43_1$ and $43_2$ for communicating the fluid chamber 41 with the fitting hole 35 in the lower portion of the valve seat body 38 are coaxially provided along the diametric line of the valve seat body 38 in the valve housing 30. At the same time, a valve seat 44 directed to the fitting hole 35 is formed in the first lateral hole $43_1$ in which a spherical valve body 45 to be seated on the valve seat 44 is fitted, whereas a spherical stopcock is fixedly secured by press-fitting and caulking in the second lateral hole $43_2$. A valve spring 46 for urging the spherical valve body 45 toward the valve seat 44 is provided therein. The check valve 24 thus consists of the valve seat 44, the spherical valve body 45 and the valve spring 46.

A fixed core 50 is integrally formed with the upper end portion of the valve housing 30, and the lower end portion of a non-magnetic guide cylinder 51 with its upper end closed hemispherically is fitted into and liquid-tightly welded to the fixed core 50. The outer periphery of the guide cylinder 51 is fitted onto a coil case 52 held by the casing 26.

The coil case 52 is made of magnetic material and a bobbin 54 with a coil 53 wound on the guide cylinder 51 is contained in the coil case 52.

A moving core 55 corresponding to the fixed core 50 is slidably fitted in the guide cylinder 51. In the moving core 55, a large-diameter guide hole 56 opening in the upper edge face of the moving core 55 and a small-diameter through-hole 57 opening in the lower edge face thereof are provided so that the guide hole 56 and the through-hole 57 are coaxial and made to communicate with each other with a stepped stopper portion 58 (stopper) integrally formed therebetween. A push bar 59 is slidably fitted in the guide hole 56 so that its descending limit is defined by the stepped stopper portion 58 and that its small-diameter shaft 59a in the lower end portion of the push bar 59 is passed through the through-hole 57 and brought into contact with the upper end of the valve body 39.

A relief spring 60 for urging the push bar 59 toward the valve body 39 is contained in the guide hole 56, and a spring seat body 61 for setting a set load by pressing the upper end of the relief spring 60 is press-fitted into the guide hole 56. By controlling the depth at which the spring seat body 61 is press-fitted into the guide hole 56, the load of the relief spring 60 is set at a predetermined value sufficiently larger than that of the set load of the valve spring 40 used to urge the valve body 39 in the direction of opening the valve.

The moving core 55 is made to move between an upper limit position where it is brought into contact with the upper end portion of the guide cylinder 51 and a lower limit position where it is brought into contact with the upper end of the fixed core 50, the vertical stroke being assumed to be $S_1$ in this case. On the other hand, the valve body 39 is caused to ascend and descend between the open-valve position where the valve body 39 is brought into contact with the lower end of the push bar 59 held by the relief spring 60 in the contact position with respect to the stepped stopper portion 58 and the closed-valve position where it is seated on the valve seat 38a. The ascending-descending stroke $S_1$ of the moving core 55 is set slightly greater than the opening-closing stroke $S_2$ thereof.

Figure 4:
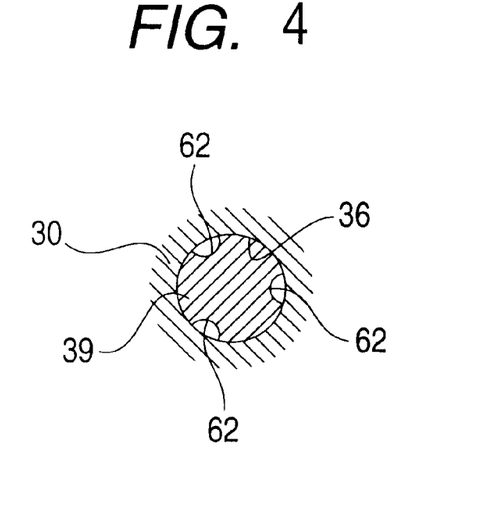
FIG. 4 is a cross-sectional view taken on section line 4—4 of FIG. 2.
Figure 5:
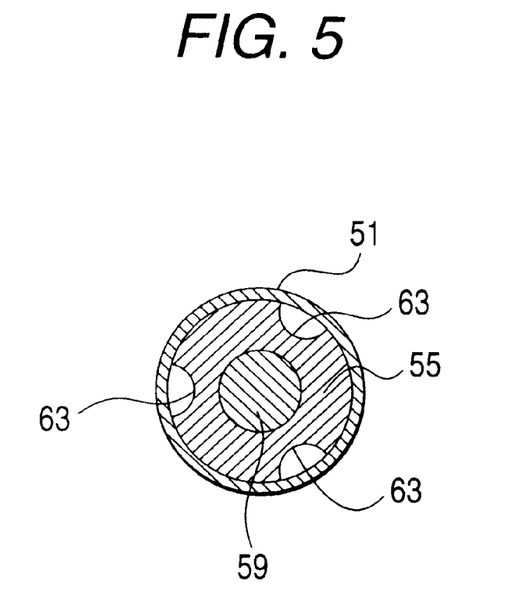
FIG. 5 is a cross-sectional view taken on section line 5—5 of FIG. 2.

As shown in FIGS. 4 and 5, a plurality of grooves 62 for communicating both upper and lower edge faces with each other are provided on the outer peripheral face of the valve body 39, and a plurality of grooves 63 for communicating both upper and lower edge faces with each other are also provided on the outer peripheral face of the moving core 55. Furthermore, a through-hole 65 is formed in the central portion of the spring seat body 61. Consequently, the insides of the valve opening 36, the guide cylinder 51 and the guide hole 56 are always maintained at the same pressure because of the grooves 62 and 63 and the through-hole 65.

A first filter $64_1$ for filtering the hydraulic fluid directed from the first and second output hydraulic passages $21_1$ and $22_2$ to the fluid hole 42 and the valve seat 38a is fitted in the annular fluid chamber 41. A second filter $64_2$ for filtering the hydraulic fluid directed from the valve seat 38a to the hydraulic passages $34_1$ and $34_2$ is fitted in the fitting hole 35. Thus, the push bar 59 and the relief spring 60 constitute the relief means 23. The function of this embodiment will subsequently be described.

The valve body 39 is forced up by the set load of the valve spring 40 in the demagnetized state of the coil 53 and since the push bar 59 is held in contact with the stepped stopper portion 58 of the moving core 55 because of the large set load of the relief spring 60, the valve body 39, the push bar 59 and the moving core 55 are integrally forced up to the upper limit as shown in FIG. 2 because of the set load of the valve spring 40. Consequently, there are formed a gap corresponding to the opening-closing stroke $S_2$ between the valve body 39 and the valve seat 38a, and a gap corresponding to the ascending-descending stroke $S_1$ between the fixed core 50 and the moving core 55. When the braking hydraulic pressure is outputted from the first and second output ports $1_1$ and $1_2$ to the respective first and second output hydraulic passages $2_1$ and $2_2$ in that state because of the operation of the master cylinder M, the hydraulic pressure is passed through the annular fluid chamber 41, the fluid hole 42 and the valve body 38 sequentially before being applied from the hydraulic passages $34_1$ and $34_2$ to the respective first through fourth normally open electromagnetic valves $5_1$–$5_4$ (FIG. 1). The corresponding wheel brakes $B_1$–$B_4$ (FIG. 1) can thus be operated as set forth above.

When the coil 53 is excited so as to prevent the left and right wheels from spinning, the moving core 55 is lowered together with the push bar 59 and the valve body 39 and absorbed by the fixed core 50 because of the electromagnetic force generated between the fixed and moving cores 50 and 55. Since the stroke $S_1$ of the moving core 55 at this time is greater than the stroke $S_2$ of the valve body 39 as stated above, the valve body 39 becomes seated and closed before the moving core 55 is absorbed by the fixed core 50. Subsequently, the moving core 55 is absorbed by the fixed core 50 while the push bar 59 is left in the position where it has been brought into contact with the standstill valve body 39, whereby the push bar 59 operates to slightly contract the relief spring 60 remaining to be slightly separated from the stepped stopper portion 58 of the moving core 55. Therefore, the then load of the relief spring 60 functions as the force of closing the valve seat 38a of the valve body 39 and blocks the flow of the hydraulic fluid discharged from the first and second hydraulic pumps $11_1$ and $11_2$ toward the first and second output hydraulic passages $2_1$ and $2_2$, that is, toward the master cylinder M to ensure that the hydraulic fluid is supplied to the corresponding front wheel brakes $B_1$ and $B_3$ as stated above with the effect of preventing the front wheels from spinning.

When the discharge pressure, that is, the hydraulic pressure in the valve seat body 38, in the first and second hydraulic pumps $11_1$ and $11_2$ exceeds a predetermined value, the valve body 39 is caused to not only open against the set load of the relief spring 60 but also relieve the excessive discharge pressure in the first and second hydraulic pumps $11_1$ and $11_2$ into the first and second output hydraulic passages $2_1$ and $2_2$ via the fluid hole 42 and the annular fluid chamber 41, thereby to avoid making the excessive hydraulic pressure act on the front wheel brakes $B_1$ and $B_3$.

When the braking hydraulic pressure is outputted from the first and second output ports $1_1$ and $1_2$ toward the respective first and second output hydraulic passages $2_1$ and $2_2$ in the closed state of the valve body 39 due to the operation of the master cylinder M, the hydraulic pressure acts on the spherical valve body 45 facing the first lateral hole $43_1$ via the annular fluid chamber 41. As that hydraulic pressure forces the spherical valve body 45 to open, the braking hydraulic pressure is surely applied to the wheel brakes $B_1$–$B_4$ (FIG. 1) corresponding to the first through fourth normally open electromagnetic valves $5_1$–$5_4$ (FIG. 1) of the antilock control unit $U_1$ without being hampered by the closed valve body 39 so as to operate these wheel brakes.

In the normally open electromagnetic valves $20_1$, $20_2$, the relief means 23 (FIG. 1) contains, in the guide hole 56 formed in the central portion of the moving core 55, the push bar 59 for pushing the valve body 39 in the valve housing 30 toward the valve seat 38a, the relief spring 60 for urging the push bar 59 toward the valve body 39, and the moving core 55 provided to the stepped stopper portion 58 for defining the descending limit of the push bar 59. Hence, the valve body 39 and the push bar 59 can be positioned separated in the axial direction, which can make much more compact the valve housing 30 in the diametric direction than the conventional housing structure in which the valve body and the push bar are arranged together. Moreover, the electromagnetic valves $20_1$ and $20_2$ can be prevented from becoming lengthy in the axial direction because the interior of the moving core 55 can be utilized for arranging the push bar 59 and the relief spring 60.

Since the fitting hole 35 for use in press-fitting the valve seat body 38 and the valve opening 36 for use in slidably fitting the valve body 39 are coaxially formed in the valve housing 30, the valve seat body 38 and the valve body 39 can accurately and coaxially be arranged with ease. It is therefore possible to decrease the malfunction of the valve body 39 while the production cost is decreased.

This invention is not limited to the aforementioned embodiment but may be modified in various manners in view of design without departing from the scope and spirit thereof. For example, the normally open electromagnetic valves $20_1$, $20_2$ equipped with the respective relief means 23 are applicable to not only a traction control unit $U_2$ but also any one of hydraulic equipment.

As set forth above, according to the first feature of the invention, the push bar capable of pushing the valve body toward the valve seat and the relief spring for urging the push bar toward the valve body are contained in a guide hole formed in the central portion of the moving core and that the stopper is provided within the moving core, the stopper being used for holding the valve body open by defining a limit to which the push bar is moved forward with respect to the valve body when the moving core is moved backward and for allowing the valve body to be closed by the relief spring when the moving core is moved forward, so that the valve body and the push bar can be arranged axially and separately from each other. Consequently, the valve housing is made to have a compact diameter by suppressing an increase in the axial length of the electromagnetic valve.

According to the second feature of the invention, the coaxial formation of the fitting hole for fitting the valve seat body having the valve seat and the valve opening for slidably fitting the valve body therein in the valve housing makes it possible to arrange the valve seat body and the valve body readily and coaxially with precision without increasing the production cost. Thus, high-quality, inexpensive normally open electromagnetic valves can be offered.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An electromagnetic valve comprising:
   a valve housing having a valve seat;
   a valve body contained in the valve housing such that the valve body is positioned opposite to the valve seat so that the valve body can be seated on the valve seat, the valve body is formed with a plurality of grooves for communicating upper and lower edges with each other on an outer peripheral surface thereof;
   a valve spring for urging the valve body in the direction of separating the valve body from the valve seat;
   a fixed core coupled to one end of the valve housing;
   a moving core which is longitudinally movable with respect to the fixed core and used for seating the valve body on the valve seat when moved in a first direction;
   a coil for moving the moving core in the first direction when excited;
   a push bar positioned to push the valve body toward the valve seat and a relief spring for urging the push bar in the first direction toward the valve body, the push bar and the relief spring being contained in a guide hole formed in a central portion of the moving core; and
   a stopper provided within the guide hole of the moving core and defining a limit to which the push bar is moved in the first direction by the relief spring to engage the valve body so that the valve body is held open by the valve spring when the moving core is moved in a second direction opposite to the first direction and for allowing the valve body to be closed by the push bar and relief spring when the moving core is moved in the first direction.

2. An electromagnetic valve as claimed in claim 1, wherein the valve seat is formed on a valve seat body, the electromagnetic valve further comprising:
   a fitting hole for fitting the valve seat body therein; and
   a valve opening for slidably fitting the valve body therein, the fitting hole and the valve opening being coaxially and communicatively formed in the valve housing.

3. An electromagnetic valve as claimed in claim 2 wherein the valve seat body is press fit in the fitting hole in the valve housing.

4. An electromagnetic valve as claimed in claim 1 further comprising a spring seat body within the guide hole of the moving core for setting a set load by pressing an end of the relief spring.

5. An electromagnetic valve as claimed in claim 4 wherein the spring seat body is press-fitted into the guide hole, a depth at which the spring seat body is press-fitted into the guide hole determining a load of the relief spring.

6. An electromagnetic valve as claimed in claim 5 wherein the spring seat body is set at a depth to provide a load at a predetermined value sufficiently larger than that of a set load of the valve spring used to urge the valve body in the direction of opening the valve.

7. An electromagnetic valve as claimed in claim 1 wherein a longitudinal stroke of the moving core is set slightly greater than an opening-closing stroke of the valve body, the valve body being closed by the relief spring when the coil is excited.

8. An electromagnetic valve as claimed in claim 1, wherein the movable core is formed with a plurality of grooves for communicating upper and lower edges with each other on an outer peripheral surface thereof.

9. An electromagnetic valve as claimed in claim 4, wherein said spring seat body is formed with a through hole in a center portion thereof.

10. An electromagnetic valve as claimed in claim 1, wherein said push bar is formed in a stepped shape at a lower portion thereof.

11. An electromagnetic valve comprising:
    a valve housing having a valve seat;
    a valve body contained in the valve housing such that the valve body is positioned opposite to the valve seat so that the valve body can be seated on the valve seat;
    a valve spring for urging the valve body in the direction of separating the valve body from the valve seat;
    a fixed core coupled to one end of the valve housing;

a moving core which is longitudinally movable with respect to the fixed core and used for seating the valve body on the valve seat when moved in a first direction, said moving core being formed with a plurality of grooves for communicating upper and lower edges with each other on an outer peripheral surface thereof;

a coil for moving the moving core in the first direction when excited;

a push bar positioned to push the valve body toward the valve seat and a relief spring for urging the push bar in the first direction toward the valve body, the push bar and the relief spring being contained in a guide hole formed in a central portion of the moving core; and a stopper provided within the guide hole of the moving core and defining a limit to which the push bar is moved in the first direction by the relief spring to engage the valve body so that the valve body is held open by the valve spring when the moving core is moved in a second direction opposite to the first direction and for allowing the valve body to be closed by the push bar and relief spring when the moving core is moved in the first direction.

12. An electromagnetic valve as claimed in claim 11, wherein the valve seat is formed on a valve seat body, the electromagnetic valve further comprising:

a fitting hole for fitting the valve seat body therein; and a valve opening for slidably fitting the valve body therein, the fitting hole and the valve opening being coaxially and communicatively formed in the valve housing.

13. An electromagnetic valve as claimed in claim 12, wherein the valve seat body is press fit in the fitting hole in the valve housing.

14. An electromagnetic valve as claimed in claim 11, further comprising a spring seat body within the guide hole of the moving core for setting a set load by pressing an end of the relief spring.

15. An electromagnetic valve as claimed in claim 14, wherein the spring seat body is press-fitted into the guide hole, a depth at which the spring seat body is press-fitted into the guide hole determining a load of the relief spring.

16. An electromagnetic valve as claimed in claim 15, wherein the spring seat body is set at a depth to provide a load at a predetermined value sufficiently larger than that of a set load of the valve spring used to urge the valve body in the direction of opening the valve.

17. An electromagnetic valve as claimed in claim 11, wherein a longitudinal stroke of the moving core is set slightly greater than an opening-closing stroke of the valve body, the valve body being closed by the relief spring when the coil is excited.

18. An electromagnetic valve as claimed in claim 11, wherein the valve body is formed with a plurality of grooves for communicating upper and lower edges with each other on an outer peripheral surface thereof.

19. An electromagnetic valve as claimed in claim 14, wherein said spring seat body is formed with a through hole in a center portion thereof.

20. An electromagnetic valve as claimed in claim 11, wherein said push bar is formed in a stepped shape at a lower portion thereof.

* * * * *